United States Patent Office.

SAMUEL R. WHITLOW, OF LIMESTONE TOWNSHIP, ILLINOIS.

Letters Patent No. 113,713, dated April 11, 1871.

IMPROVEMENT IN MEDICAL COMPOUNDS OR BITTERS.

The Schedule referred to in these Letters Patent and making part of the same.

*To all whom it may concern:*

Be it known that I, SAMUEL R. WHITLOW, of Limestone township, in the county of Peoria and in the State of Illinois, have invented a new and useful Medical Compound, which I denominate "Democratic Bitters;" and do hereby declare that the following is a full, clear, and exact description of the ingredients forming said compound, the quantities of each, and the manner of compounding, making, and using the same.

The ingredients and their respective quantities are—

Oil of cinnamon, twenty-five drops; oil of sassafras, twenty drops; oil of cloves, twenty-three drops; tincture of spikenard, three ounces; tincture of comfrey, two ounces; tincture of columba, two ounces; white sugar, one-half pound; spirits, one gallon; water, one quart; curcumin or curcuma, a sufficient quantity to give the desired color.

Mix the oils above mentioned with the spirits, add the sugar and water, and lastly the curcumin, and bottle up for use.

The dose is a wine-glass full three times a day, and is for the curing of or invigoration of the stomach, liver, and the entire human system, and for improving the digestion, strengthening the lungs, counteracting malaria, and purifying the blood, acting as a general tonic and gentle stimulant.

Having thus described my invention,

What I claim as new, and desire to secure by Letters Patent, is—

The compound medicine called Democratic Bitters, prepared and compounded and to be used substantially as described.

In testimony that I claim the foregoing medical compound I have hereunto set my hand this 13th day of March, 1871.

SAMUEL R. WHITLOW.

Witnesses:
WILLIAM JACK,
L. ROBISON.